United States Patent
Beauregard

(10) Patent No.: US 9,498,897 B2
(45) Date of Patent: Nov. 22, 2016

(54) SYSTEM AND PROCESS FOR MOLDING OF PARTS MADE OF FIBER CEMENT

(71) Applicant: 161508 CANADA INC., Portneuf (CA)

(72) Inventor: Louis Beauregard, Quebec (CA)

(73) Assignee: 161508 CANADA INC., Portneuf (CA)

(*) Notice: Subject to any disclaimer, the term of this patent is extended or adjusted under 35 U.S.C. 154(b) by 8 days.

(21) Appl. No.: 14/653,758

(22) PCT Filed: Jul. 29, 2014

(86) PCT No.: PCT/CA2014/050711
§ 371 (c)(1),
(2) Date: Jun. 18, 2015

(87) PCT Pub. No.: WO2016/015128
PCT Pub. Date: Feb. 4, 2016

(65) Prior Publication Data
US 2016/0263773 A1 Sep. 15, 2016

(51) Int. Cl.
B28B 1/52 (2006.01)
B28B 1/24 (2006.01)
(Continued)

(52) U.S. Cl.
CPC . B28B 1/52 (2013.01); B28B 1/24 (2013.01); B28B 3/003 (2013.01); B28B 21/38 (2013.01); B28B 7/46 (2013.01); B28B 21/20 (2013.01);
(Continued)

(58) Field of Classification Search
CPC ........... B28B 7/46; B28B 3/003; B28B 1/52; B28B 21/20; B28B 21/38; B28B 21/88; B29C 33/50; B29C 33/505
USPC ...................... 425/389; 264/313, 314, 86, 87
See application file for complete search history.

(56) References Cited

U.S. PATENT DOCUMENTS 2,383,736 A 8/1945 Rembert et al.
2,932,874 A 4/1960 Ludwig et al.
(Continued)

FOREIGN PATENT DOCUMENTS

AU 2013204660 A1 10/2014
DE 19841047 C1 1/2000
WO WO-2009106061 A2 9/2009

OTHER PUBLICATIONS

International Search Report and Written Opinion for Application No. PCT/CA2014/050711, mailed Apr. 27, 2015.

Primary Examiner — Joseph S. Del Sole
Assistant Examiner — Lawrence D Hohenbrink, Jr.
(74) Attorney, Agent, or Firm — Marshall, Gerstein & Borun LLP

(57) ABSTRACT

A system and a method for molding a part from fiber cement, or fibrocement, slurry are provided. The molding is preferably made by pressure injection of the slurry. The slurry includes cementitious material, additives, fibers and water. The fibers can include polypropylene, polyethylene, polyacrylic, cellulose, and/or asbestos fibers. First and second molding sections define, at least partially, a chamber. The second molding section has at least one evacuating channel. The system includes a slurry inlet communicating with the chamber, for inserting the slurry. A bladder covers the first molding section, the bladder being inflatable for compressing the slurry between the bladder and the second molding section. A filter covers the second molding section and allows water contained in the slurry to pass through while retaining the cementitious material and fibers within the chamber. A pressurized fluid inlet port communicates with at least one conduit for inflating the bladder.

32 Claims, 12 Drawing Sheets

(51) Int. Cl.
  *B28B 3/00* (2006.01)
  *B28B 21/38* (2006.01)
  *B28B 21/20* (2006.01)
  *B28B 21/88* (2006.01)
  *B29C 33/50* (2006.01)
  *B28B 7/46* (2006.01)

(52) U.S. Cl.
  CPC ................ *B28B 21/88* (2013.01); *B29C 33/50* (2013.01); *B29C 33/505* (2013.01)

(56) References Cited

U.S. PATENT DOCUMENTS

| | | | |
|---|---|---|---|
| 3,358,342 A | 12/1967 | Spence | |
| 3,549,737 A | 12/1970 | Schulze | |
| 3,581,780 A | 6/1971 | Ono et al. | |
| 3,923,937 A | 12/1975 | Piccioli et al. | |
| 3,945,782 A | 3/1976 | Farahar | |
| 3,950,465 A | 4/1976 | Farahar | |
| 4,049,022 A | 9/1977 | Farahar | |
| 4,522,772 A | 6/1985 | Bevan | |
| 4,524,039 A | 6/1985 | Bevan | |
| 4,836,969 A | 6/1989 | Colin et al. | |
| 5,021,205 A | 6/1991 | Niioka | |
| 5,891,374 A | 4/1999 | Shah et al. | |
| 6,398,998 B1 | 6/2002 | Krenchel et al. | |
| 8,070,997 B2 | 12/2011 | Guerrini et al. | |
| 2009/0016828 A1 | 1/2009 | Guerrini et al. | |
| 2010/0327488 A1 | 12/2010 | Ay et al. | |
| 2016/0046039 A1* | 2/2016 | Hume | B28B 7/344 106/638 |

* cited by examiner

SYSTEM AND PROCESS FOR MOLDING OF PARTS MADE OF FIBER CEMENT

CROSS-REFERENCE TO RELATED APPLICATION

The present application is the US national phase of International Patent Application No. PCT/CA2014/050711, filed Jul. 29, 2014.

FIELD OF THE INVENTION

This invention relates to processes and systems for molding cement-based parts. More specifically, the invention relates to a system and process for molding parts from fiber cement-based slurry, which is preferably injected under pressure.

BACKGROUND OF THE INVENTION

Fiber cement is typically made from a slurry of Portland cement (80-85%), which forms the matrix of the material, and a mixture of mineral, organic or synthetic fibers (15-20%), which contributes to making the cement material stronger and better at withstanding tensile and flexural strains. The slurry also generally contains different types of additives. Fibers used in fiber cement can include polypropylene, polyethylene, polyacrylic, cellulose, and/or asbestos. Fiber cement can be used in the manufacturing of a variety of parts, such as pipes and panels for example. Parts from fiber cement are known to be relatively inexpensive to manufacture while being very durable and capable of withstanding stress, due to the reinforcement provided by the fibers.

In the most popular fiber cement pipe manufacturing process, known as the Hatschek process, the slurry is dewatered using a rotary sieve cylinder and a very thin layer of fiber cement is produced. This thin layer is wrapped around a mandrel under pressure until a pipe with the desired wall thickness is obtained. After curing, the extremities of the pipe are cut to obtain the desired pipe length. The pipes are then finished in order to receive couplings that are produced by cutting larger diameter pipe into sections. This process requires the slurry to have a water-to-cement ratio of 200% w in order for the process to operate in a continuous mode. However, this process is typically only being used to manufacture cylindrical pipes.

Other existing methods for forming fiber cement parts include vibration molding, extrusion, and centrifugation molding. The water-to-cement ratio for such methods is generally below 50% w. When using a higher water-to-cement ratio, these methods produce fiber cement parts with a high porosity, compromising the mechanical properties of the part formed.

A continuous extrusion process known to the Applicant is disclosed in U.S. Pat. No. 6,398,998 by KRENCHEL et al. This process uses a flowable suspension containing cement, additives, other components such as fibers, and a surplus of water or other liquid. Between the inlet and the outlet of the molding section, a high pressure differential, produced by applying a high positive pressure to the slurry in the mold and by a pressure-regulating chamber located outside the mold, causes the liquid to be expelled through wall perforations distributed in a particular fashion in the draining section of the molding apparatus. This method leaves a dewatered shaped body with sufficient mechanical strength to be handled immediately upon completion of the process. This process requires continuous manufacturing and parts must be shaped with the same geometry restrictions as in a regular extrusion process.

A challenge for some of the above-mentioned processes resides in dewatering the slurry while preserving a uniform fiber distribution within the cement parts. Fibers must not be evacuated along with the water expelled from the slurry, and water needs to be evacuated rapidly from the slurry in order to increase productivity. In addition, the parts formed need to be sufficiently dewatered in order to have sufficient green strength, allowing for the part to be handled out of the mold and be cured. Another drawback of the processes discussed above is the limited geometry and/or size of the manufactured parts.

There is a need for a system and process which allow for the molding of fiber cement parts of various shapes and sizes. There is also a need for a system and a process for manufacturing such fiber cement parts quickly and reliably, and at a reasonable cost.

SUMMARY OF THE INVENTION

A system and a method for molding a part from fiber cement, or fibrocement, slurry are provided. The slurry comprises cementitious material, additives, fibers and water. In an embodiment, the system includes a mold assembly including first and second molding sections. The first and second molding sections define, at least partially, a chamber for receiving the slurry. The second molding section comprises at least one evacuating channel. The system includes a slurry inlet communicating with the chamber, for inserting the slurry in the chamber. A bladder covers the first molding section, the bladder being inflatable for compressing the fibrocement, or fiber cement slurry between the bladder and the second molding section. A filter covers the second molding section. The filter is permeable and allows water contained in the slurry to pass through while retaining the cementitious material and fibers within the chamber. A pressurized fluid inlet port communicates with at least one conduit for inflating the bladder.

Preferably, the bladder is made of a stretchable and fluid-impermeable material, such as elastomeric material or polymeric material for example. In some embodiments, the bladder may comprise one or more bladder sections, according to the geometry of the mold assembly.

Preferably, the filter is made of a flexible material, such as a textile with fibers spaced apart by interspaces. The fibers may be comprised of synthetic fibers.

Preferably, the second molding section has a sidewall extending between inner and outer faces, the at least one evacuating channel comprising a plurality of holes extending from the inner face to the outer face.

According to some embodiments, the second molding section comprises at least one sieve provided with openings, the at least one evacuating channel comprising said openings. Preferably, the at least one sieve comprises a stack of sieves. The at least one sieve is preferably rigid, and may be made of metal or other materials, such as steel, stainless steel, brass, aluminum, and nylon. The sieve may have different mesh sizes, but a configuration with identical mesh sizes is also possible.

In some embodiments, the second molding section comprises at least two shells. Preferably, the mold assembly includes said at least two shells, comprising first and second shells, and the first molding section is a core for placement inside the first and second shells, the mold assembly being for forming hollow parts. The mold assembly may comprise a cap for sealingly connecting the first and second shells with the core, the pressurized fluid inlet port being connectable to the cap.

According to one embodiment, the chamber formed by the first and second section of the mold assembly has a rectangular shape; the mold assembly being for forming plate-shaped parts. According to another possible embodiment, the chamber formed by the first and second section of the mold assembly has a disk shape; the mold assembly being for forming disk-shaped parts.

In some embodiments, the system comprises an injection system connectable to at least one slurry inlet, for injecting the slurry in the chamber. Preferably, the system comprises an attachment assembly for attaching one of the molding sections to the injection system.

The system may comprise a fluid pressurizing system, for inflating the bladder. Preferably, the fluid pressurizing system comprises a source of pressurized fluid, the source being a source of air or, alternatively, a source of water. The fluid pressurizing system may comprise a controller to control the pressure of the fluid and may also comprise a compressor for injecting the fluid in the bladder with a pressure between 25 and 2000 PSI.

In some embodiments, the system comprises additional pressurized fluid inlet ports. The system may also comprise at least one conduit for distributing the pressurized fluid to the bladder.

In some embodiments, the system comprises a fastening assembly for fastening the first and the second molding sections together.

Preferably, the system comprises a pump for removing water expelled from the at least one evacuating channel.

According to another aspect of the invention, a method is provided for molding a part from fiber cement slurry, the slurry comprising cementitious material, additives, fibers and water. The method comprises the steps of:

a) providing a mold assembly including a first and second molding sections, the first molding section being covered with a bladder and the second molding section being covered with a permeable filter and defining, at least partially, a chamber for receiving the slurry, the second molding section comprising at least one evacuating channel;

b) inserting the slurry in the chamber;

c) inflating the bladder for compressing the fiber cement slurry between said bladder and the second molding section, thereby evacuating the water contained in the slurry from the chamber through the filter and through the at least one evacuating channel while retaining the cementitious material and fibers within the chamber;

d) deflating the bladder; and e) removing the mold assembly.

The method thereby provides a shaped body having sufficient green strength to be handled after the mold assembly has been removed.

Preferably, step c) of the method is performed during a predetermined period of time. Still preferably, the predetermined period of time is between 30 seconds and 5 minutes.

Preferably, during step b) of the method, the slurry has a ratio between water and cementitious material comprised between 50-300% by weight.

In some embodiments, step b) of the method is performed by pouring the slurry in the chamber. In other embodiments, step b) of the method is performed by injecting the slurry in the chamber.

This invention exhibits many advantages over localised prior art. The system and method allow molding of parts of various shapes and sizes. Non cylindrical parts, like elbow and wye shaped parts, can be molded in a single operation. The same system and method can be used to produce different solid and hollow parts, thanks to the combination of the bladder and filter in the present invention. Furthermore, slurry injection within the mold chamber increases the productivity of the whole system while limiting the costs of manufacturing and ensuring better quality products.

BRIEF DESCRIPTION OF THE DRAWINGS

Other objects, advantageous and features of the present invention will become more apparent upon reading the following none-restrictive description of preferred embodiments thereof, given for the purpose of exemplification only, and in reference to the accompanying drawings in which.

DESCRIPTION OF PREFERRED EMBODIMENTS

Figure 1:
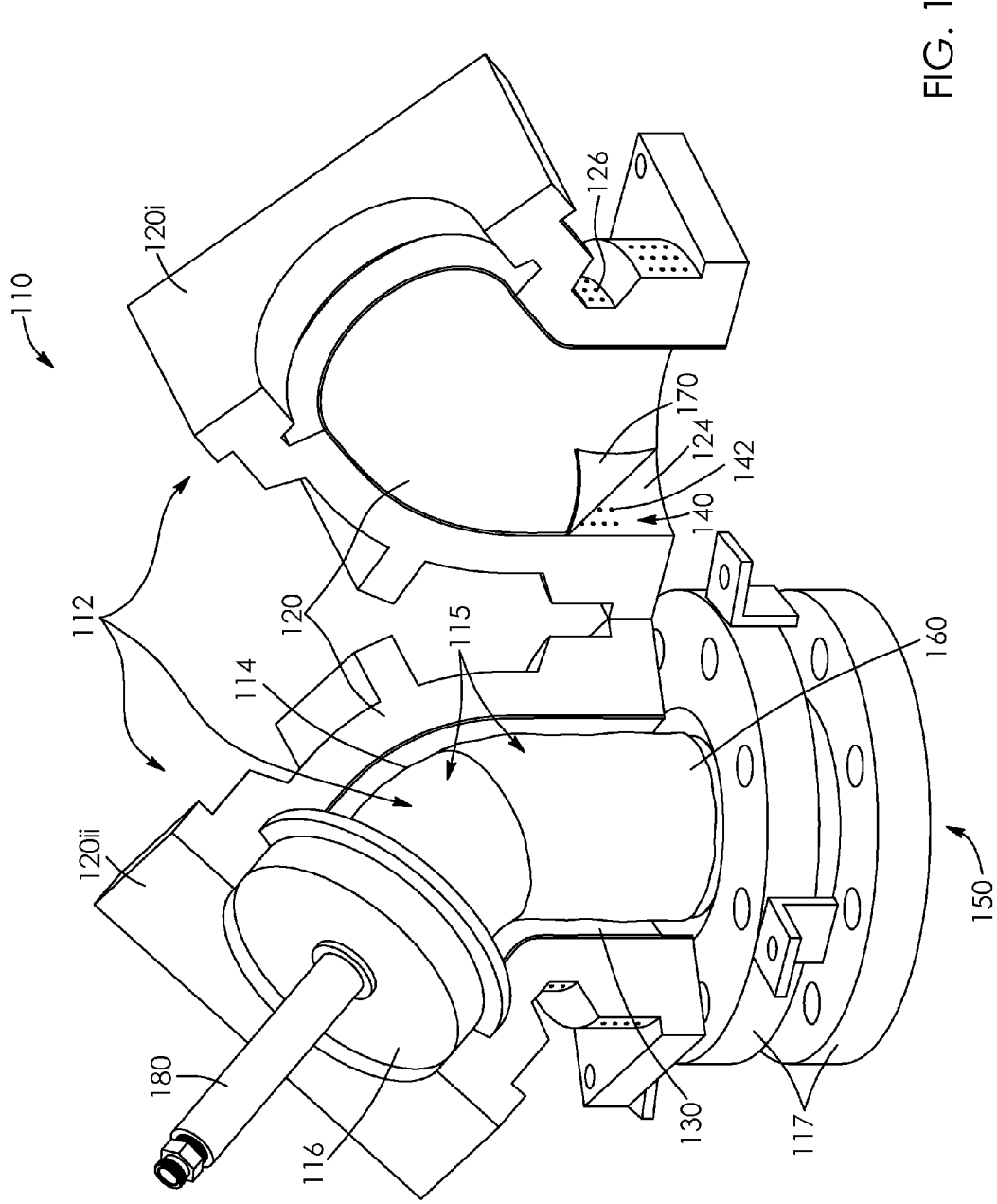
FIG. 1 is a perspective view of a system for molding a part, according to a first embodiment of the invention, for molding elbow-shaped pipes.

In the following description, similar features in the drawings have been given similar reference numerals. For the sake of clarity, certain reference numerals have been omitted from the figures when they have already been identified in a preceding figure.

NUMERAL REFERENCES

Figure 2:
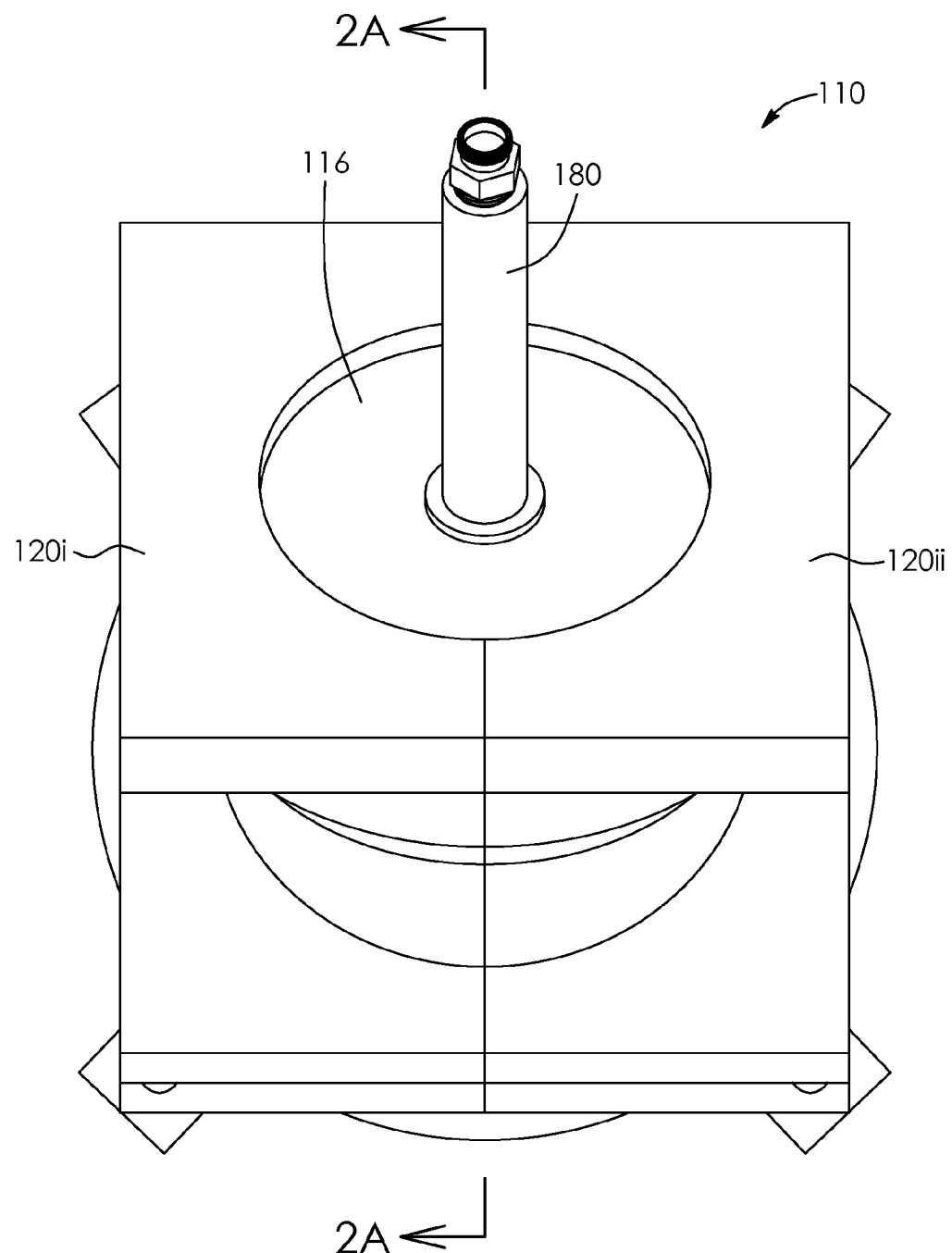
FIG. 2 is a front view of the system of FIG. 1.

100 molded part
101 slurry
102 water
110, 210, 310 system
112, 212, 312 mold assembly
313 conical part
114, 214, 314 first molding section
115, 315 core
116, 316 cap
117, 317 attachment assembly 218, 318 fastening assembly
319 casing
120, 220, 320 second molding section
120i, 120ii first and second shell
122, 222, 322 sidewall of second molding section
124, 224, 324 inner face of second molding section
126, 226, 326 outer face of second molding section
227i, 227ii, 227iii sieves forming second molding section
130, 230, 330 chamber
140, 240, 340 at least one evacuating channel
142, 242, 342 holes, spacings in sieves
150, 250, 350 slurry inlet
160, 260, 360 bladder
170, 270, 370 filter
180, 280, 380 pressurized fluid inlet port
182, 282, 382 at least one pressurized fluid conduit
190 injection system
192 slurry inlet tube
194 pressurized fluid inlet
196 fluid pressurizing system
197 pressurized fluid
198 controller
199 compressor
262 frame
284 container
286, 386 pump Referring to FIGS. 1 to 3, a first possible embodiment of a system 110 for molding a part is shown. The part 100 (identified in FIG. 2B) is made from a slurry, which typically includes cementitious material, additives, fibers and water. Preferably, the slurry has a water to cement weight ratio between 50 to 300%. This range of ratios allows the slurry to have a lower viscosity, allowing it to completely fill the chamber during compression. Other factors such as the geometry and the desired mechanical properties of the molded part will determine the slurry composition to be used. The slurry can be referred to as fiber cement or fibrocement slurry. The fibers used in the slurry can include synthetic fibers, such as polypropylene, polyethylene, polyacrylic, vegetable/cellulose, and/or asbestos fibers, and the likes.

Figure 2A:
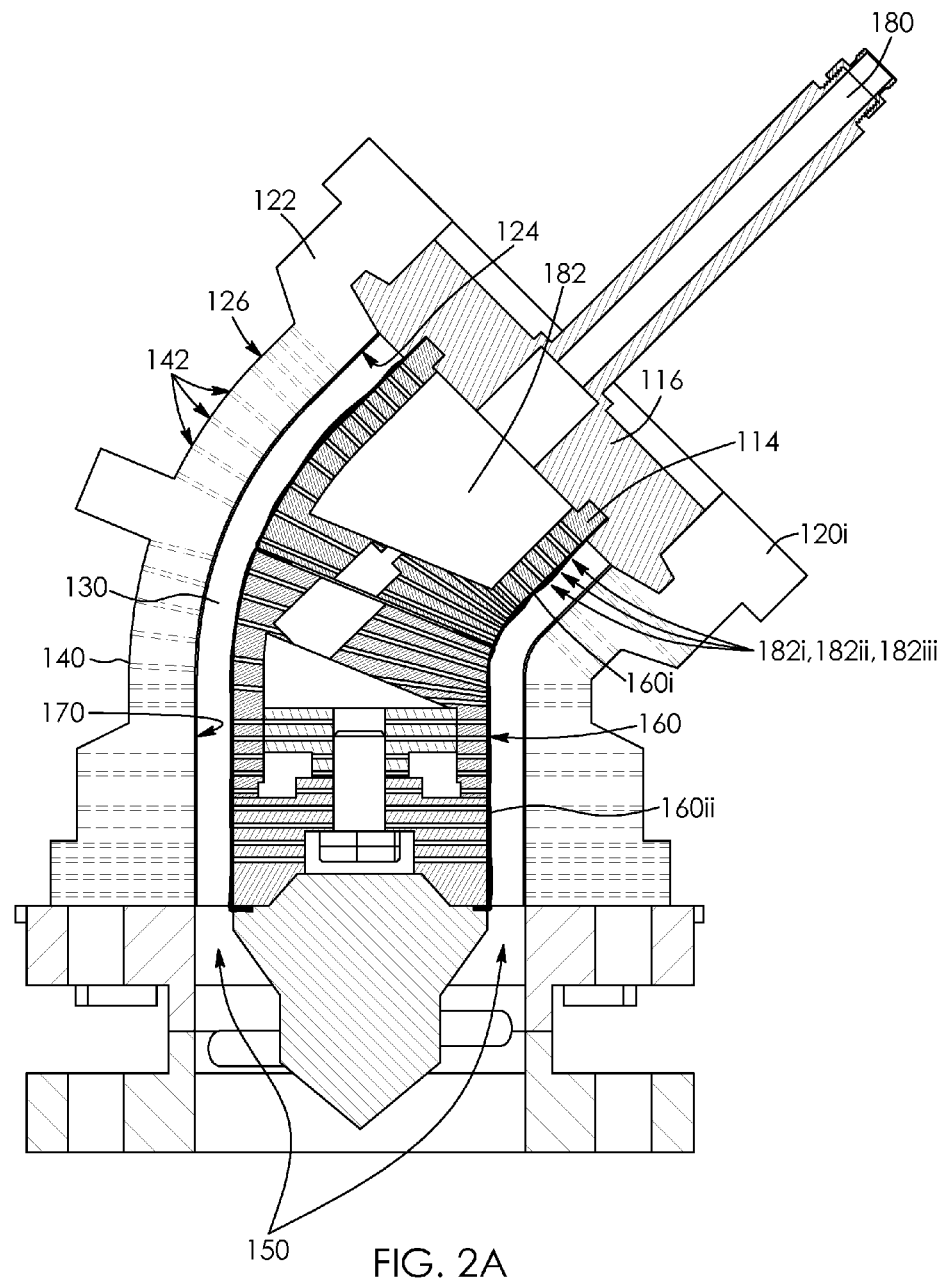
FIG. 2A is a cross-sectional view of the system, taken along line 2A-2A of FIG. 2.
Figure 2B:
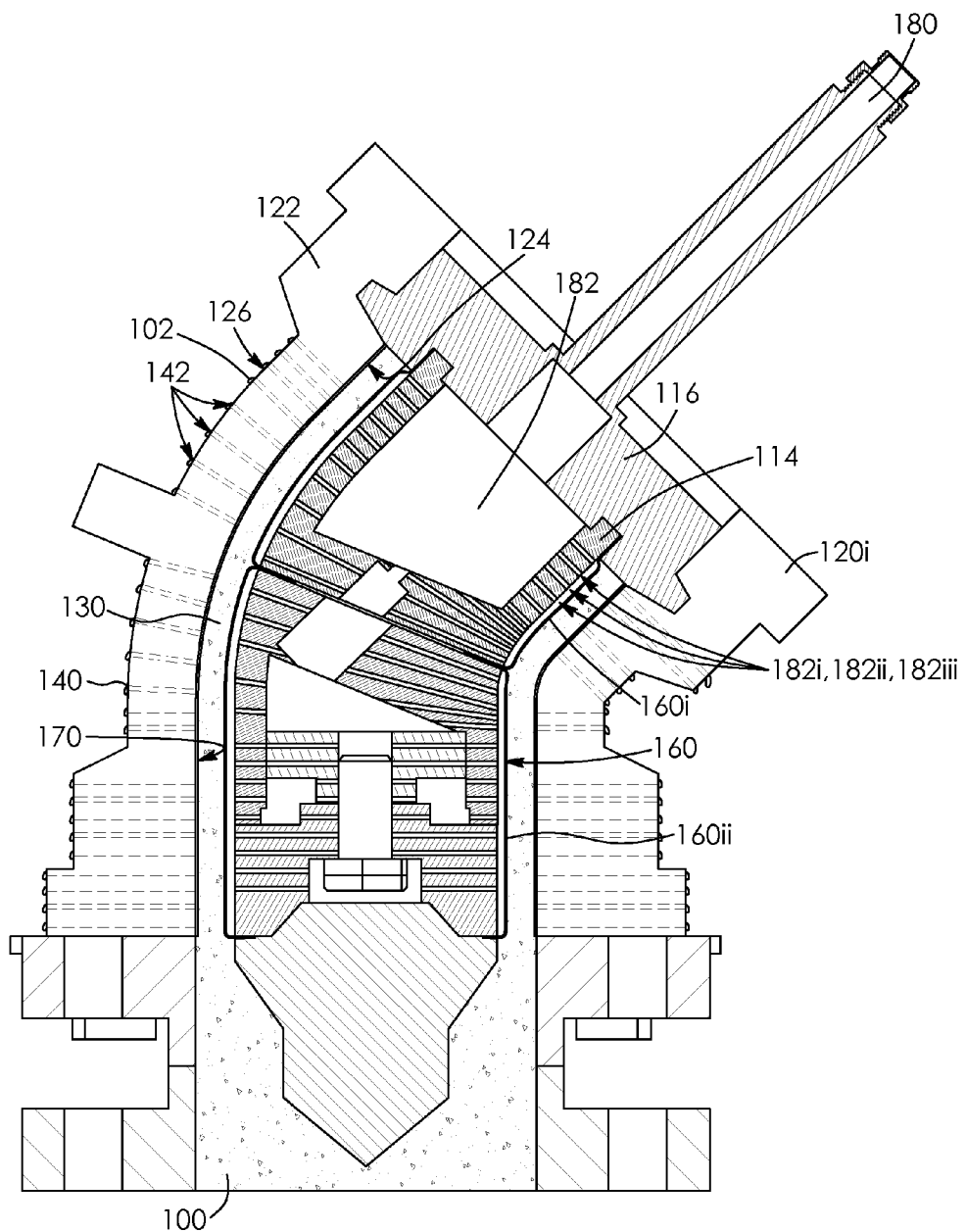
FIG. 2B is a cross-sectional view of the system, shown during operation.

The system 110 comprises a mold assembly 112 which includes first and second molding sections 114, 120. In this embodiment, the second molding section 120 consists of a first shell 120i and a second shell 120ii, and the first molding section 114 is a core 115 for placement inside the first and second shells 120i, 120ii. The shells 120i, 120ii are shaped to allow easy removal of the molded part. The unmolding is also facilitated by the core which is removable from the interior of the molded part. In FIG. 1, the mold assembly is shown in an opened configuration, but in operation, the shells are affixed together, as shown in FIGS. 2, 2A and 2B. As can be appreciated, this embodiment of the mold assembly 110 is thus for forming hollow parts. While in this embodiment the second molding section 120 comprises two outer shells 120i, 120ii, it is possible for this second section 120 to be made of a single component, as is the case for other embodiment of the system described later on in the description. Alternatively, the second section 120 can be made of two or more subsections or shells. In this particular embodiment, the mold assembly 110 also comprises a cap, for sealingly connecting the first and second shells 120i, 120ii with the core 115. The mold assembly 110 can also include an attachment assembly 117 to affix an injection system 190 (shown in FIG. 3A) to at least one of the molding sections 114, 120.

As best shown in FIGS. 2A and 2B, the first and second molding sections 114, 120 define, at least partially, a chamber 130 for receiving the slurry. The second molding section 120 comprises at least one evacuating channel 140. In this particular embodiment, the second molding section 120 has a sidewall extending between an inner face 124 and an outer face 126. The evacuating channel 140 includes a plurality of holes 142 which extend from the inner face 124 to the outer face 144. Preferably, the holes 142 are distributed according to a regular pattern on the surface of the second molding section 120, allowing expelled water to be evacuated efficiently after passing through a filter 170 while being small enough to prevent filter deviation within the holes on the inner face of the sidewall 124. The system 110 also includes a slurry inlet 150 communicating with the chamber 130, for inserting the slurry in the chamber. A bladder 160 covers the first molding section 114, this first molding section corresponding in this case to the cylindrical core 115. The bladder 160 is inflatable for compressing the fiber cement slurry between the bladder 160 and the second molding section 120. Preferably, the bladder 160 is made of a stretchable and fluid-impermeable material. For example, the bladder can be made of made of elastomeric material or polymeric material. In this embodiment, the bladder includes two bladder sections 160i, 160ii, conforming or being adapted to the specific geometry of the first molding section. In other embodiments, it is possible that the bladder be made of a single membrane, or of several sections, each communicating with conduit linked to the inlet of pressurized fluid. A bladder comprised of several sections allows the molding of an elbow-shaped part, for example. Furthermore, this configuration facilitates removing the molded part from the mold assembly.

A filter 170 covers the second molding section 120 (i.e. shells 120i, 120ii). The filter 170 is permeable and allows water contained in the slurry to pass through while retaining the cementitious material and fibers within the chamber 130. If this embodiment, the filter is made from a flexible material, so as to adapt to the contour of the inner face of second molding section. A filter made of flexible material allows the filter to deflect when compressed by the slurry, hence completely filling the molding chamber and consequently resulting in a molded part exhibiting the desired geometry. Moreover, the use of a flexible filter is preferred because of the ease of manipulation and installation in the mold assembly.

The flexible material of the filter can be made from textile fibers spaced apart by interspaces, these interspaces being smaller than particles of the cementitious material. In other words, the area or length of the interspaces is based on the size of the fibers contained in the slurry. The interspaces are smaller than particles of the cementitious material in order to allow the filter to retain the cementitious particles, typically ranging from 10 um to 100 um and the fibers found in the slurry. The size of slots or interspaces in the filter 170 can be sized depending on the type of cementious material and fibers used in the slurry. Preferably, the flexible material of the filter is made from synthetic fibers. A fabric made of weaved synthetic fibers offers good flexibility, low cost and a suitable interspace between the fibers for the present invention. Of course, in embodiments where the inner face of the second molding section is flat, the filter could be rigid instead of being flexible.

Finally, a pressurized fluid inlet port 180 communicates with at least one conduit 182 for inflating the bladder 160. In this particular embodiment, the pressurized fluid inlet port 180 is connectable to the cap 116. In other embodiments, the system may comprise additional pressurized fluid inlet ports.

Additional pressurized fluid inlet ports are preferable for molding large size and/or geometrically complex parts. For example, a wye-shaped molding assembly preferably uses at least two fluid inlet ports, one in the main branch and another one in the secondary branch.

Figure 3B:
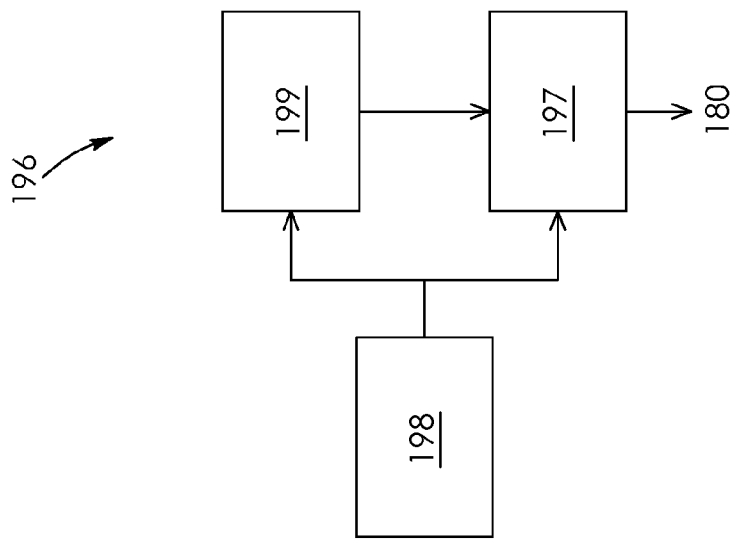
FIG. 3B is schematic of a fluid pressurizing system, according to a possible embodiment.
Figure 3A:
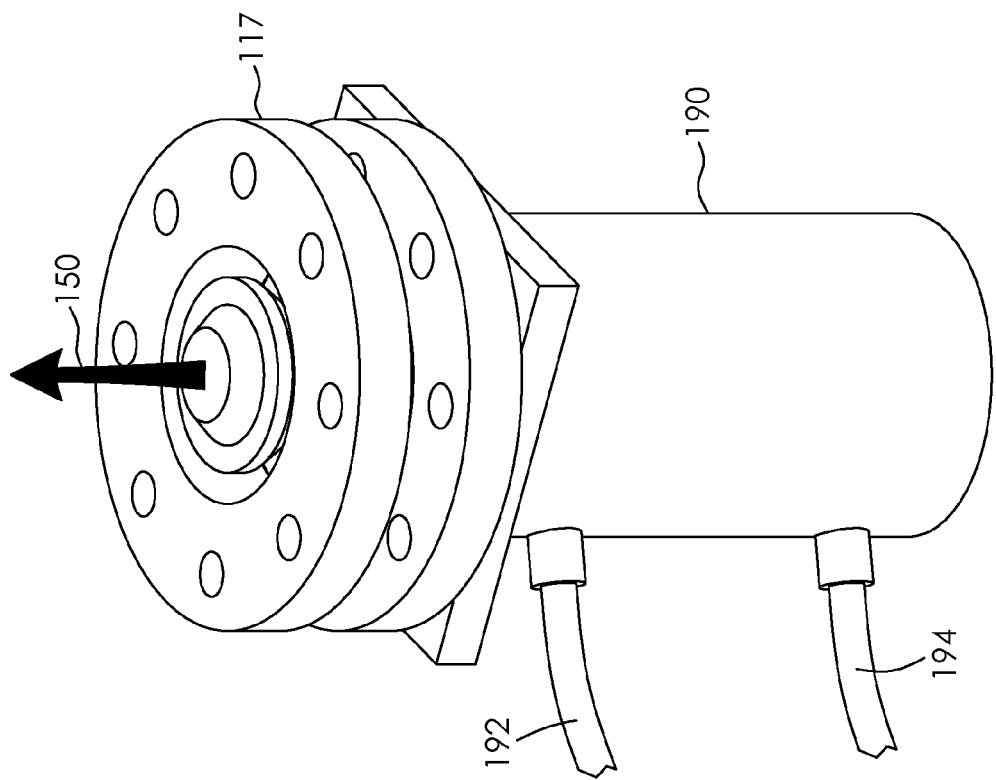
FIG. 3A is a side view of a portion of the system, showing the injection system.

Referring to FIG. 3A, a possible embodiment of an injection system 190 is shown. In some cases, it may be practical and advantageous to provide the molding system with an injection system. The injection system is connectable to the slurry inlet 150, for injecting the slurry into the chamber, between the first and second molding sections (not shown in this Figure). The injection system 190 comprises a slurry inlet tube 192, for transferring the slurry from a mixer or other receptacle to the injection system, and a pressurized fluid inlet tube 194, to push a piston (not shown) which will force the slurry into the inlet 150, and into the system's chamber. In this embodiment, the injection system is connectable to the inlet 150 via the attachment assembly 117.

The molding system can include a fluid pressurizing system 196, such as the one represented schematically in FIG. 3B. The fluid pressurizing system include a source of pressurized fluid 197, and also preferably a compressor 199 to compress the fluid, allowing injection of the fluid in the bladder with a pressure which will vary depending on the composition of the slurry. For example, the pressure of the fluid injected the bladder can vary between 50 and 2000 PSI. The source of pressurized fluid is preferably a source of air or water, but other fluids can be considered. A controller 198 is preferably used to control the pressure of the fluid used to inflate the bladder. The pressurized fluid enters through the pressurized fluid inlet port 180, and then though the conduit 182. In this embodiment, the at least one conduit 182 comprises several conduits 182*i*, 182*ii*, 182*iii* (only three conduits are identified in FIGS. 2A and 2B) which extend in the sidewall of the first molding section. The conduit 182 serves to distribute pressurized fluid to the bladder 160. An even distribution of the pressurized fluid to the bladder is preferred for even distribution of the compression forces on the slurry, hence providing a consistent dewatering of the slurry throughout the chamber. Alternatively, uneven distribution of the pressurized fluid is preferred in configurations where a specific volume of slurry is desired to be less dewatered.

Referring to FIGS. 1 to 3, a method for molding a part from fiber cement slurry will be described. In a first step, a mold assembly 110 is provided. The slurry is injected into the chamber 130, and the bladder 160 is inflated for compressing the fiber cement slurry between the bladder 160 and the second molding section 120. As best shown in FIG. 2B, water 102 contained in the slurry is thereby evacuated from the chamber 130, through the filter 170 and through at least one evacuating channel 140, which is this embodiment consists of a plurality of holes in the sidewall of the second molding section 120. Thanks to the filter 170, the cementitious material and fibers are retained in the chamber 130. The bladder 160 can then be deflated, and the molded part 100 can then be removed from the mold assembly 112, in this case by opening the first and second shells 120*i*, 120*ii*. After performing the method, a shaped body 100 having sufficient green strength to be handled is provided.

Inflating the bladder is performed for a predetermined period of time, which can be for example between 30 seconds and 5 minutes; this period is determined as a function of the pressure of the pressurized fluid.

Preferably, the insertion of the slurry in the chamber is made by injection, such as with the injection system 190. According to other embodiments, the slurry may be injected by a plurality of injection points or as a full section of the desired shaped part. The advantage of the latter technique is to minimize the defects at the interfacial zone of the two or more slurry fronts meeting in the chamber, preventing undesired porosity or other defects in the afterwards cured parts in the said interfacial zone.

Referring now to FIGS. 4 to 8, another possible embodiment of a molding system will be described. In this variant of the system, the chamber 230, identified in FIG. 6A, has a rectangular shape and the mold assembly 212 is for forming plate-shaped parts. Of course, it is also possible to configure the chamber with a circular shape, so as to be able to form disk-shaped parts.

Figure 4:
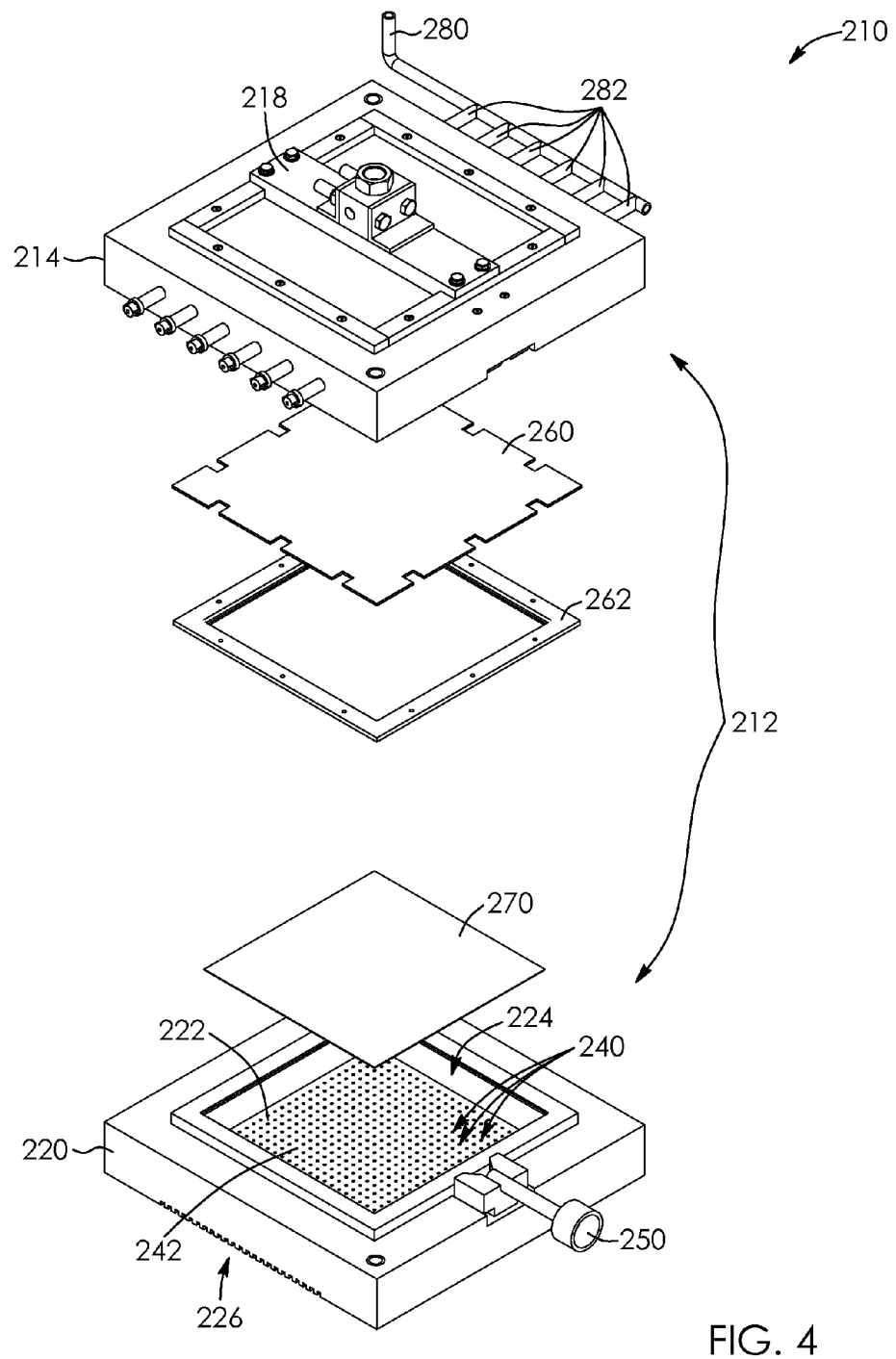
FIG. 4 is an exploded view of a system for molding a part, according to a second embodiment of the invention, for molding rectangular plates.
Figure 6A:
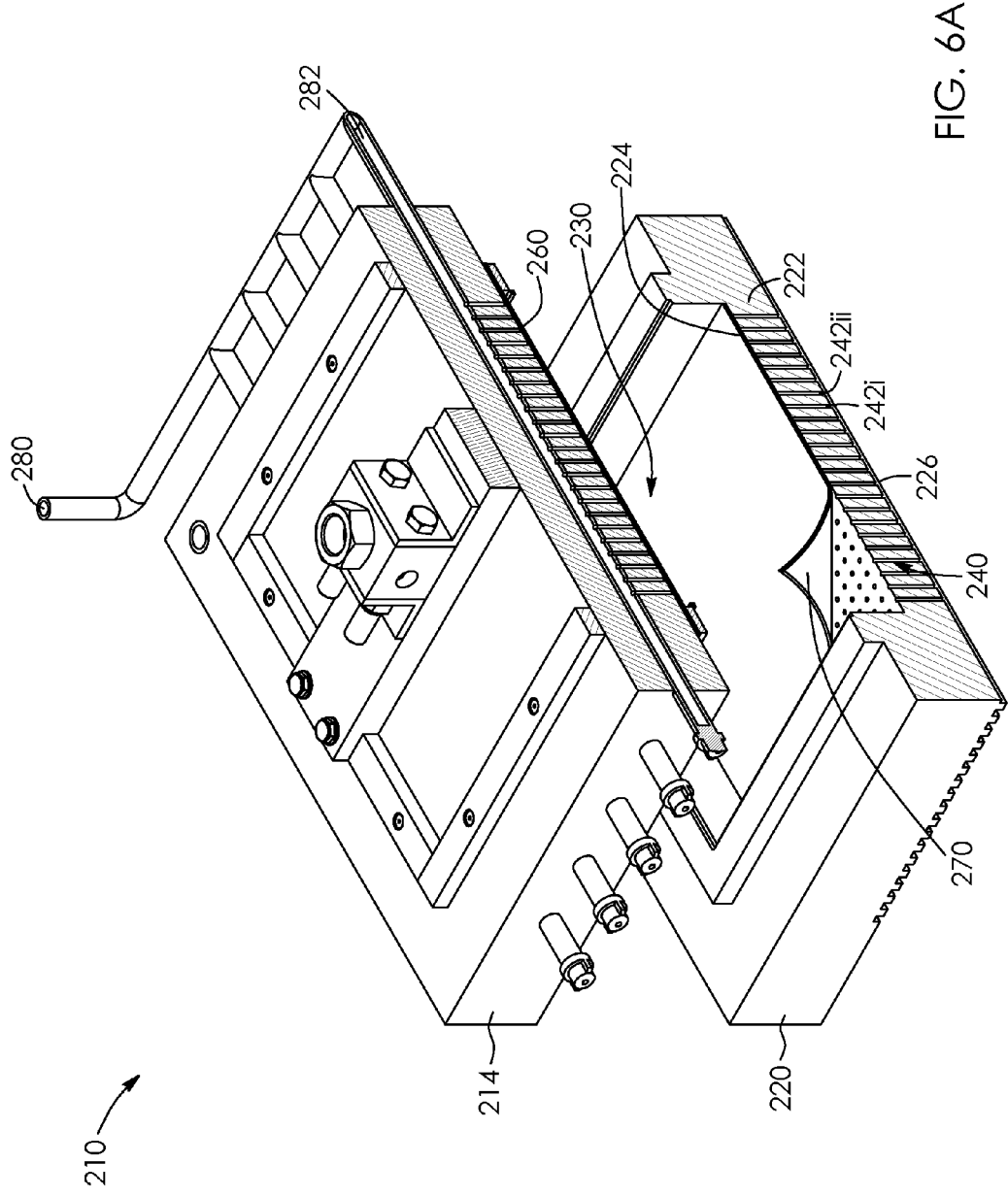
FIG. 6A is a partially exploded cross-sectional view of the system of FIG. 4, in a first configuration.
Figure 6B:
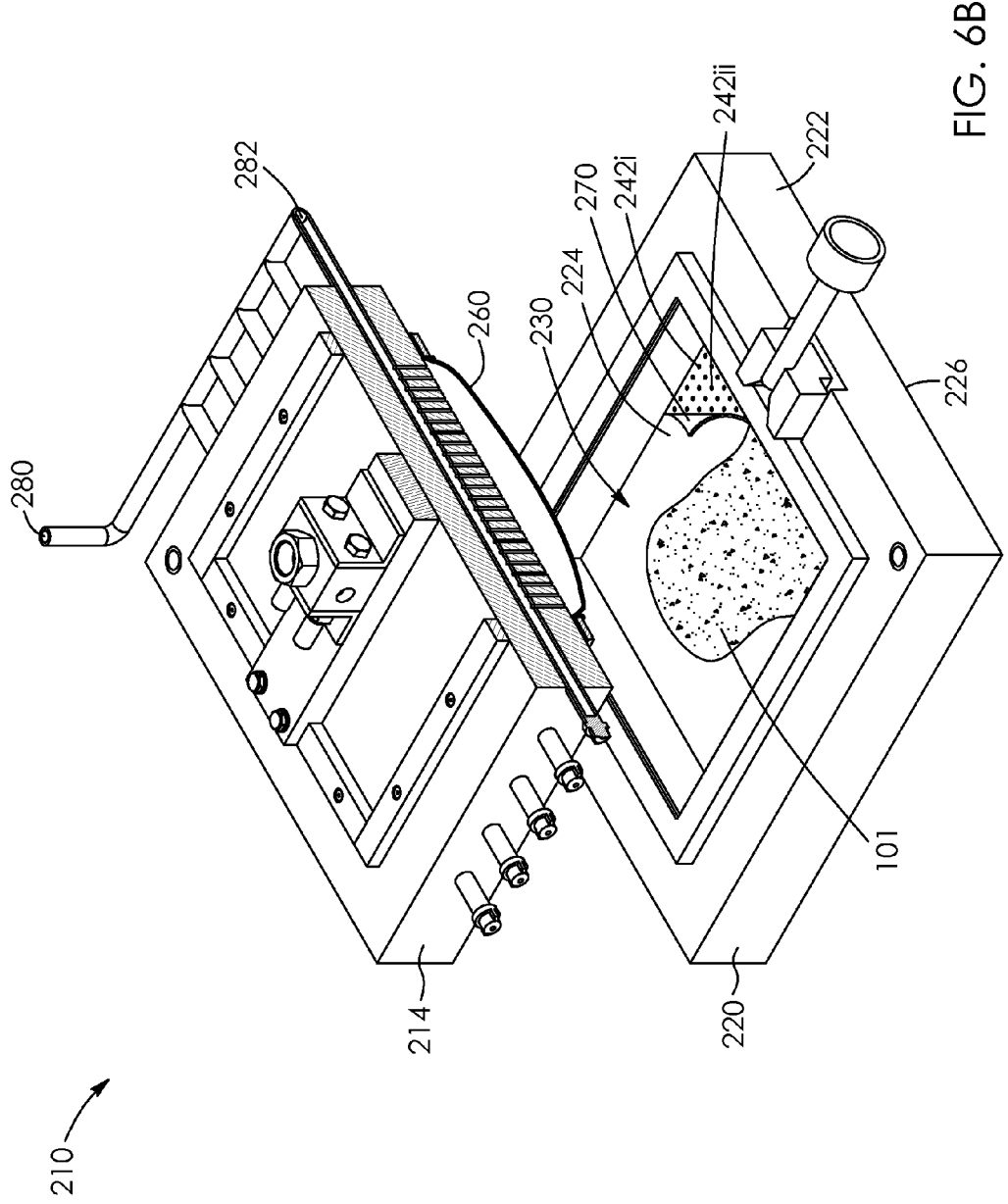
FIG. 6B is a partially exploded cross-sectional view of the system of FIG. 4, in a second configuration, shown with the bladder inflated.

Referring to FIG. 4, the system 210 includes a mold assembly 212. The mold assembly 212 includes a first molding section 214 and a second molding section 220. The first and second molding sections, as best shown in FIG. 6A, define at least partially the chamber 230 for receiving the fiber cement slurry with a water to cement ratio of at least 50%. The second molding section 220 comprises at least one evacuating channel 240, which in this embodiment takes the form of a plurality of holes 242 extending in the sidewall 222 of the section, from its inner face 224 to its outer face 226. The system 220 includes a slurry inlet 250 communicating with the chamber, for injecting the slurry in the chamber. In this embodiment, an injection system is optional, since the slurry may be simply poured into the cavity defined by the recess in the inner side 224 of the second molding section 220, prior to fastening the two sections 214, 220 together. A fastening assembly 218 can be used to fasten the first and second sections 214, 220 together. A bladder 260 covers the first molding section 214. In this embodiment, a frame 262 is used to affix the bladder 260 to the inner face of the first molding section 214. As best shown in FIG. 6A, where the bladder is shown in a first configuration, and in FIG. 6B, where the bladder is shown in a second configuration, the bladder is inflatable to compress the fiber cement slurry 101 between the bladder's membrane and the second molding section 220. The fastening assembly 218 allows the system to withstand stresses induced by the compression of the slurry by the bladder 260 while preserving the geometry of the desired molded part. The assembly also aligns the mold assembly parts together, ensuring that the mold assembly is correctly assembled.

Figure 8:
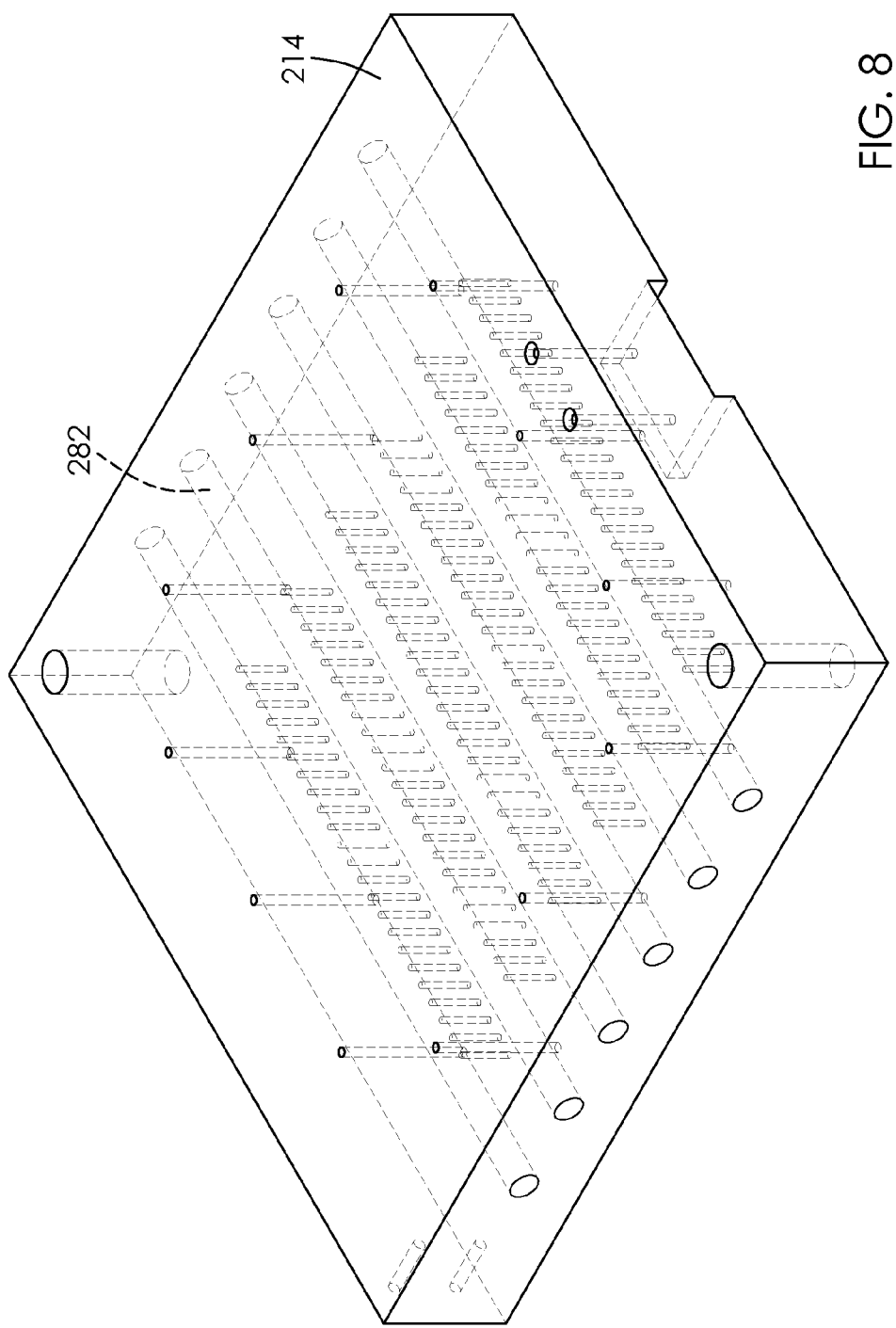
FIG. 8 is ghost view of a molding section of the mold assembly part of the second embodiment of the invention.

Still referring to FIG. 4, a filter 270 covers the second molding section 220. Similar to the first embodiment, the filter 270 is permeable so as to allow water contained in the slurry to pass through it while retaining the cementitious material and fibers. In this variant, the filter can be rigid. The system also includes a pressurized fluid inlet port 280 communicating with at least one conduit 282 for inflating the bladder 260. It is of course possible for the system 210 to include additional pressurized fluid inlet ports. In this case, the at least one inlet conduit 282 comprises several conduits made of tubing extending within the sidewall of the first molding section 214. The conduits 282 comprise several tubes connected to holes extending in the sidewall of the first section 214, as best shown in FIG. 8.

Figure 5:
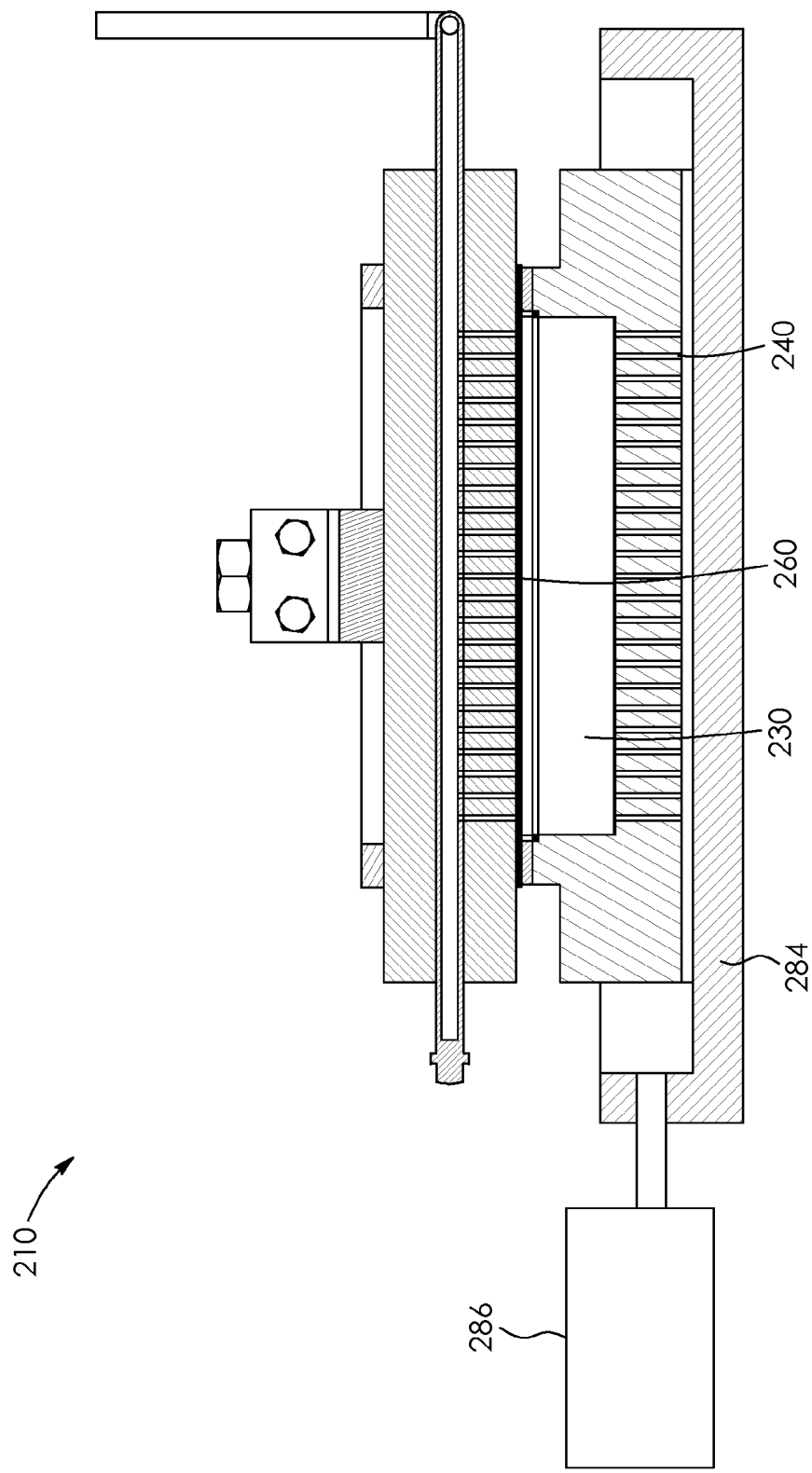
FIG. 5 is a front cross-sectional view of the system of FIG. 4, shown assembled.

Referring to FIG. 5, it is possible that the system include a pump 286 for removing water expelled from the evacuating channels 240. Water drainage is desirable in operation because water is an incompressible material. Hence, it is preferable that the water being passed through the filter 270 is drained efficiently from the evacuating channels 240. A container 284 can be provided to collect water expelled from the slurry, prior to being removed by the pump 286.

Figure 7:
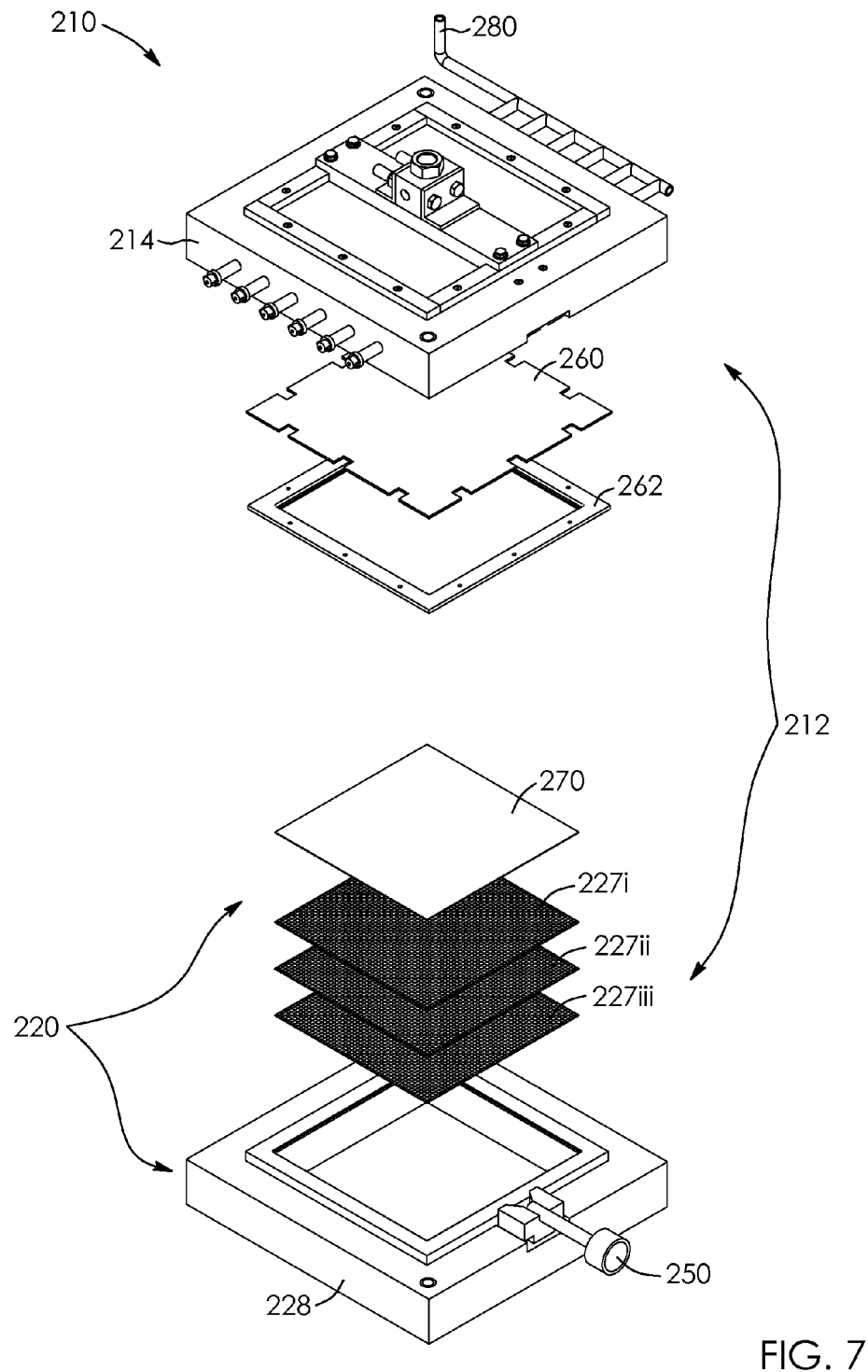
FIG. 7 is an exploded view of the second embodiment of the invention, showing a stack of sieves used for evacuating the water.

Referring to FIG. 7, another possible embodiment of the second molding section 220 is shown. In this embodiment, the second molding section 220 includes at least one sieve 227i provided with openings. The sieve's openings provide a similar function in place of the holes in the sidewall of the second molding section, according to the first embodiment; it allows water to be evacuated efficiently after passing through the filter. This configuration is preferred when molding a part requiring very specific surface qualities. In the example illustrated, the second molding section 220 comprises a stack of sieves 227i, 227ii, 227iii. The evacuating channel of the system is formed by the plurality of openings in the sieve(s). The sieves can be chosen with identical or different mesh sizes. In the latter case, the larger openings are preferably located on the sieve closer to the chamber. If the slurry has a surplus of water, a coarser mesh size allows more water to be expelled between the sieves but compromises the cement matrix. Cement goes out. Alternatively, a finer sieve keeps the fines particles, but clogs the surface. The sieves can be rigid or flexible. The sieves can be made of metal, such as steel, stainless steel, brass, aluminum, and nylon, for example. Typically, the size of the openings in the sieves can vary from 100 to 625 Tyler, as an example only. In this embodiment of the molding section 220, a frame 228 is used to affix the sieves, and water is evacuated through the openings of the sieve(s), within the frame 228. With this embodiment, the molding section 220 can be placed in a container, similar to the one shown in FIG. 5, to collect drained water, and a pump can be used to evacuate water from the container.

When using this variant of the system to perform the molding process, steps similar to those described previously are conducted. The two molding sections are disconnected and the slurry is inserted in the chamber, either manually or with an injecting system. The system can thus be operated by compression molding of the slurry or preferably by pressure injection molding. When the chamber is full, the bladder is inflated with a pressurized fluid, the bladder thereby pressing the slurry against the inner face of the second molding section 220, on the filter 270 or sieves 227, depending of the variant used. Water contained in the slurry is expelled through the evacuation channels, which consists either of holes extending in the sidewall of the second molding section, or of the openings in the sieves. The pressure applied by the bladder on the slurry is maintained for a predetermined time period, typically a few minutes, until the molded part has sufficient green strength to be removed and handled without collapsing. To remove the part from the system, the bladder is deflated, and the sections 214, 220 are disassembled. The molded part can then be left to set for another predetermined time period. While it is preferred to fill the chamber with the slurry prior to starting the inflation of the bladder, it is possible to inflate the bladder while the injection of slurry is still going on, depending of the pressure of the fluid injected into the bladder. The water expelled from the chamber is preferably collected in a container 284 and evacuated with a pump 286. The process can include a step of mixing the components of the slurry, this step being conducted prior to its injection in the chamber.

Figure 9:
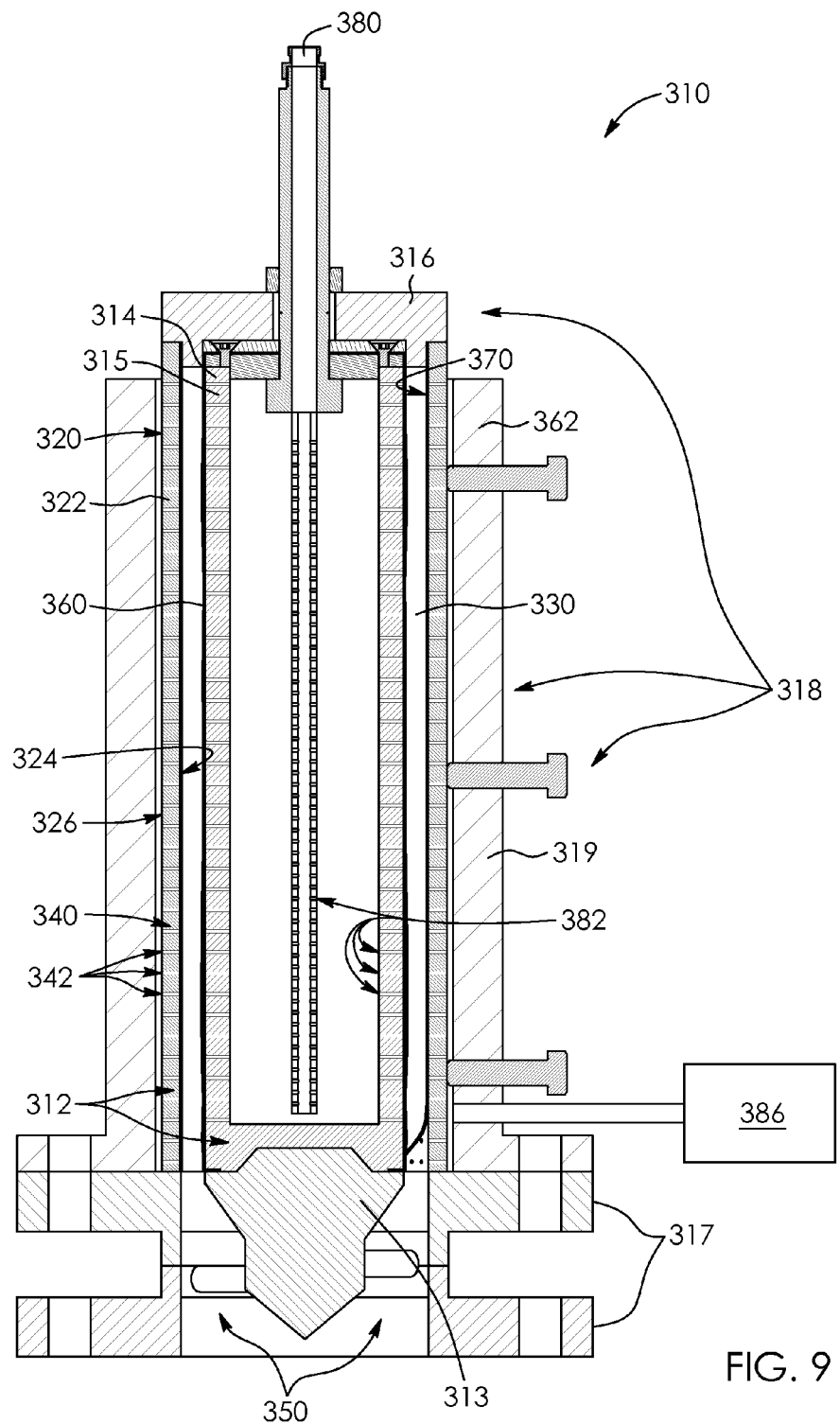
FIG. 9 is a cross-sectional view of a system for molding a part, according to a third possible embodiment of the invention, for molding cylindrical parts.

Referring to FIG. 9, a third embodiment of a molding system is shown. The system 310 allows molding fibrocement parts with a cylindrical shape, used as water pipes and fittings, and the likes. The system 310 includes a first, inner molding section 314, which is this case is a core 315 received in a second, outer molding section 320. The second molding section 320 can be made as a single piece, but is preferably made of several sub-sections or shells, to facilitate removal of the part once molded. A fastening assembly 318 allows fastening the different sections or shells of the second molding sections with the first section 314. The fastening assembly also preferably includes a cap 316, for closing off the chamber 330 and a casing 319 with bolts, for fastening the shells of the outer section 320. An attachment assembly 317 is also preferably provided, to affix an injection system to it. While the injection system is not shown in this figure, it is possible that the system 310 includes one, such as the one shown in FIG. 3A for example. A pump 386, such as a vacuum pump, can be used to collect the evacuated water.

Similar to the other embodiments, a filter 370 is provided on the inner face of the second molding section 320, and at least one evacuating channel 340 extends through the sidewall 322 of section 320, from the inner face 324 to the outer face 326. In this case, there is a plurality of evacuating channels 340 shaped as holes 342 in the sidewall of section 320. An inflatable bladder 360 is provided on the inner face of the first molding section 314. A pressurized fluid inlet 380 is in fluid communication with the inside of the bladder 360 via conduits 382. In this case the conduits 382 comprise a perforated tube extending in the center of the inner section 314, and several holes extending in the sidewall of the first molding section 314. The several conduits 282 provide a uniform distribution of the pressurized fluid to the bladder, but it can be considered, in other embodiments, to use a single conduit directing pressurized fluid from the inlet 380 to the bladder 360. The system includes a slurry inlet 350, which in this case corresponds to the annular opening formed at the bottom of the molding assembly 312. A substantially conical part 313 can be placed near the inlet 350, to promote a uniform slurry front when the slurry is injected into the chamber 360.

A molding process similar to the one described for the first embodiment can be used with this third embodiment of the system.

The present invention should not be limited to the preferred embodiment set forth in the examples but should be given the broadest interpretation consistent with the description as a whole.

The invention claimed is:

1. A system for molding a part from a slurry, the slurry comprising cementitious material, additives, fibers and water, said system comprising:
    a mold assembly including first and second molding sections, said first and second molding sections defining, at least partially, a chamber for receiving the slurry, the second molding section comprising at least one evacuating channel;
    a slurry inlet communicating with the chamber, for inserting the slurry in the chamber;
    a bladder covering the first molding section, the bladder being inflatable for compressing the fiber cement slurry between said bladder and the second molding section;
    a filter covering the second molding section, the filter being permeable and allowing the water contained in the slurry to pass through while retaining the cementitious material and fibers within the chamber; and
    a pressurized fluid inlet port communicating with at least one conduit for inflating the bladder.

2. The system according to claim 1, wherein the bladder is made of a stretchable and fluid-impermeable material.

3. The system according to claim 1, wherein the bladder is made of elastomeric material or polymeric material.

4. The system according to claim 1, wherein the bladder comprises one or more bladder sections, to conform to the geometry of the first molding section.

5. The system according to claim 1, wherein the filter is made from a flexible material.

6. The system according to claim 5, wherein the flexible material is made from textile fibers spaced apart by interspaces, said interspaces being smaller than particles of the cementitious material.

7. The system according to claim 6, wherein the flexible material comprises synthetic fibers.

8. The system according to claim 1, wherein the second molding section has a sidewall extending between inner and outer faces, the at least one evacuating channel comprising a plurality of holes extending from the inner face to the outer face.

9. The system according to claim 1, wherein the second molding section comprises at least one sieve provided with openings, the at least one evacuating channel comprising said openings.

10. The system according to claim 9, wherein said at least one sieve comprises a stack of sieves.

11. The system according to claim 9, wherein the at least one sieve is rigid.

12. The system according to claim 11, wherein the at least one sieve is made of metal.

13. The system according to claim 11, wherein the at least one sieve is made of materials comprising at least one of a group including steel, stainless steel, brass, aluminum, and nylon.

14. The system according to claim 10, wherein the sieves have different mesh sizes.

15. The system according to claim 10, wherein the sieves have identical mesh sizes.

16. The system according to claim 1, wherein the second molding section comprises at least two shells.

17. The system according to claim 16, wherein said at least two shells comprises first and second shells, and the first molding section is a core for placement inside the first and second shells, the mold assembly being for forming hollow parts.

18. The system according to claim 16, wherein the mold assembly comprises a cap for sealingly connecting the first and second shells with the core, the pressurized fluid inlet port being connectable to the cap.

19. The system according to claim 1, wherein the chamber has a rectangular shape, the mold assembly being for forming plate-shaped parts.

20. The system according to claim 1, wherein the chamber has a disk shape, the mold assembly being for forming disk-shaped parts.

21. The system according to claim 1, comprising an injection system connectable to the slurry inlet, for injecting the slurry in the chamber under pressure.

22. The system according to claim 21, wherein the mold assembly comprises an attachment assembly for attaching the injection system to at least one of the molding sections.

23. The system according to claim 1, comprising a fluid pressurizing system, for inflating the bladder.

24. The system according to claim 23, wherein the fluid pressurizing system comprises a source of pressurized fluid.

25. The system according to claim 24, wherein the source of pressurized fluid is a source of air.

26. The system according to claim 24, wherein the source of pressurized fluid is a source of water.

27. The system according to claim 23, wherein the fluid pressurizing system comprises a controller to control the pressure of the pressurized fluid.

28. The system according to claim 23, wherein the fluid pressurizing system comprises a compressor for injecting the fluid in the bladder with a pressure between 25 and 2000 PSI.

29. The system according to claim 1, comprising additional pressurized fluid inlet ports.

30. The system according to claim 1, comprising additional slurry inlets communicating with the chamber.

31. The system according to claim 1, wherein the molding assembly comprises a fastening assembly for fastening the first and the second molding sections together.

32. The system according to claim 1, comprising a pump for removing water expelled in the at least one evacuating channel.

* * * * *